US010425012B2

United States Patent
(12) United States Patent
Bianco et al.

(10) Patent No.: US 10,425,012 B2
(45) Date of Patent: Sep. 24, 2019

(54) DUAL INDEPENDENT OUTPUT LLC CONVERTER CONTROL

(71) Applicant: STMICROELECTRONICS S.R.L., Agrate Brianza (IT)

(72) Inventors: Alberto Bianco, Gressan (IT); Francesco Ciappa, Borgofranco d'Ivrea (IT); Giuseppe Scappatura, Aosta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 2 days.

(21) Appl. No.: 15/605,322

(22) Filed: May 25, 2017

(65) Prior Publication Data

US 2018/0342957 A1 Nov. 29, 2018

(51) Int. Cl.
*H02M 3/335* (2006.01)
*H02M 1/00* (2006.01)

(52) U.S. Cl.
CPC .................. *H02M 3/33561* (2013.01); *H02M 2001/0058* (2013.01)

(58) Field of Classification Search
CPC ............ H02M 3/22; H02M 3/24; H02M 3/28; H02M 3/325; H02M 3/335; H02M 3/33507; H02M 3/33515; H02M 3/33523; H02M 3/33546; H02M 3/3353; H02M 3/33538; H02M 3/33553; H02M 3/33569; H02M 3/337; H02M 3/156; H02M 1/08; H02M 1/32; H02M 1/42; H02M 1/4233; H02M 1/4241; H02M 1/4258; H02M 1/083; H02M 2001/0009; H02M 2001/0032; H02M 2001/0038; H02M 2001/0048; H02M 2001/0054; H02M 2001/0058; H02M 7/42; H02M 7/44; H02M 7/48; H02M 7/4815;
(Continued)

(56) References Cited

U.S. PATENT DOCUMENTS 5,986,895 A * 11/1999 Stewart ................. H02M 3/337 363/131
6,178,099 B1 * 1/2001 Schutten ............. H02M 3/3376 363/132

OTHER PUBLICATIONS

Elferich, R. et al., "A New Load Resonant Dual-Output Converter," (Philips Research Laboratories); 2002 IEEE 33rd Annual IEEE Power Electronics Specialists Conference Proceedings, 6 pages.

(Continued)

*Primary Examiner* — Gary L Laxton
*Assistant Examiner* — Carlos O Rivera-Perez
(74) *Attorney, Agent, or Firm* — Seed IP Law Group LLP

(57) ABSTRACT

A method and apparatus for controlling a power converter are provided. In the method and apparatus, switching from a first phase to a second phase is delayed until it is determined that both a tank current signal of the converter goes below a tank current threshold and the converter has been in the first phase for more than a first minimum time period. Then the converter determines if a resonant capacitor voltage has fallen below a first resonant capacitance voltage threshold and if a tank current signal goes above a tank current threshold. The converter switches from the first phase to the second phase in response to determining at least one of: the resonant capacitor voltage has fallen below the first resonant capacitance voltage threshold and the tank current signal goes above the tank current threshold. The converter is additionally operated in third and fourth states.

22 Claims, 6 Drawing Sheets

(58) Field of Classification Search
CPC ...... H02M 7/4818; Y02B 70/10; Y02B 70/14; Y02B 70/1491; Y02B 70/1433; Y02B 70/1416; Y02B 70/1441; Y02B 70/16; Y02B 70/348
USPC ........ 323/205–211, 235, 236, 238, 271–278, 323/282–288, 299, 301, 303, 351; 363/15–21.18, 40–43, 63, 65, 71, 76, 78, 363/79, 89, 95–99, 123, 131–134
See application file for complete search history.

(56) References Cited

OTHER PUBLICATIONS

Fairchild Semiconductor Corportion, "AN-4151 Half-Bridge LLC Resonant Converter Design Using FSFR-Series Fairchild Power Switch (FPS™)," Rev. 1.0.2—Oct. 22, 2014; www.fairchildsemi.com; 20 pages.
Hu, Z. et al., "Bang-Bang Charge Control for LLC Resonant Converters," IEEE Transactions on Power Electronics, 30(2):1093-1108, Feb. 2015, 16 pages.

* cited by examiner

DUAL INDEPENDENT OUTPUT LLC CONVERTER CONTROL

BACKGROUND

Technical Field

This application is directed to controlling a power converter, and in particular controlling an LLC converter having two independent outputs.

Description of the Related Art

Dual independent output LLC converters are a class of converters characterized in that they output two voltages that are independent of each other. The output voltages may be used to supply power to one or more devices. Because this class of converters provides two independent output voltages and the two output voltages are taken into account in performing the control, conventional control of the converters is computationally intensive. Some conventional solutions (such as that described in R. Elferich and T. Duerbaum, "A New Load Resonant Dual-Output Converter," *Proceedings of the* 33*rd Annual IEEE Power Electronics Specialists Conference,* 2002) utilize multidimensional control which increases the computational complexity required from control devices to operate the converter.

Other solutions, such as Bang-Bang charge control (BBCC) described in Z, Hu, Y. Liu, and P. C. Sen, "Bang-Bang Charge Control for LLC Resonant Converters," *IEEE Transactions on Power Electronics,* Vol. 30, No. 2, February 2015, simplify the control of dual-output LLC converters. However, such solutions simplify control at the expense of introducing critical conditions that can disrupt operation of the converter.

Accordingly, a method and a controller for controlling a dual independent output LLC converter are desired. In addition, it is also desirable for the method and controller to simplify control of the LLC converter while at the same time maintaining stability in the operation of the LLC converter.

BRIEF SUMMARY

In an embodiment, a controller for controlling a power converter having a power stage with first and second output terminals includes first and second switches configured to control the power stage; and a control stage configured to control the first and second switches using a method that includes: determining a first resonant capacitance voltage threshold based on at least a first output voltage at the first output terminal; determining a second resonant capacitance voltage threshold based on at least a second output voltage at the second output terminal; switching from a first phase, in which the first switch is on and the second switch is off, to a second phase, in which the first and second switches are off, in response to determining that a resonant capacitor voltage of the power stage has fallen below the first resonant capacitance voltage threshold; switching from the second phase to a third phase in which the second switch is on and the first switch is off; and switching from third phase to a fourth phase, in which the first and second switches are off, in response to determining that a resonant capacitor voltage of the power stage has gone above the second resonant capacitance voltage threshold.

In an embodiment, the control stage is configured to switch from the first phase to the second phase in response to determining that a tank current signal, representative of a tank current of the power stage, goes below a tank current threshold and then goes above the tank current threshold. In an embodiment, the control stage is configured to delay switching from the first phase to the second phase in response to determining that the switches have been in the first phase for less than a first minimum time period.

In an embodiment, the control stage is configured to switch from the first phase to the second phase in response to determining that the resonant capacitor voltage of the power stage has fallen below the first resonant capacitance voltage threshold after determining that a tank current signal, representative of a tank current of the power stage, goes below a tank current threshold. In an embodiment, the control stage is configured to delay switching from the second phase to the third phase in response to determining that the switches have been in the second phase for less than a second minimum time period.

In an embodiment, the control stage is configured to switch from the third phase to the fourth phase in response to determining that a tank current signal, representative of a tank current of the power stage, goes above a tank current threshold and then goes below the tank current threshold. In an embodiment, the control stage is configured to delay switching from the third phase to the fourth phase in response to determining that the switches have been in the third phase for less than a first minimum time period.

In an embodiment, the control stage is configured to switch from the third phase to the fourth phase in response to determining that the resonant capacitor voltage of the power stage has risen above the second resonant capacitance voltage threshold after determining that a tank current signal, representative of a tank current of the power stage, goes above a tank current threshold. In an embodiment, the control stage is configured to delay switching from the fourth phase to another phase in response to determining that the switches have been in the fourth phase for less than a second minimum time period.

In an embodiment, a power converter includes a power stage with first and second output terminals; a switching stage with first and second switches configured to control the power stage; and a control stage configured to control the first and second switches using a method that includes: delaying switching from a first phase, in which the first switch is on and the second switch is off, to a second phase, in which the first and second switches are off, until determining that both: a tank current signal, representative of a tank current of the power stage, goes below a tank current threshold and the switches have been in the first phase for more than a first minimum time period; determining if a resonant capacitor voltage of the power stage has fallen below a first resonant capacitance voltage threshold; determining if the tank current signal goes above a tank current threshold; switching from the first phase to the second phase in response to determining at least one of: the resonant capacitor voltage of the power stage has fallen below the first resonant capacitance voltage threshold and the tank current signal goes above the tank current threshold; switching from the second phase to a third phase in which the second switch is on and the first switch is off; and switching from third phase to a fourth phase, in which the first and second switches are off.

In an embodiment, the control stage configured to: determine the first resonant capacitance voltage threshold based on at least a first output voltage at the first output terminal; and determine a second resonant capacitance voltage threshold based on at least a second output voltage at the second output terminal.

In an embodiment, the control stage is configured to: begin determining if the resonant capacitor voltage of the power stage has fallen below the first resonant capacitance voltage threshold and begin determining if the tank current signal goes above the tank current threshold after determining that both: the switches have been in the first phase for the first minimum time period, and the tank current signal goes below the tank current threshold.

In an embodiment, the control stage is configured switch from the second phase to the third phase in response to determining that the switches have been in the second phase for a second minimum time period or longer. In an embodiment, the control stage is configured to delay switching from the third phase to the fourth phase in response until the control stage determines that the tank current signal is above the tank current threshold and the switches have been in the third phase for at least a first minimum time period. In an embodiment, the control stage is configured to, after delaying the switching, switch from third phase to the fourth phase in response to determining that the resonant capacitor voltage has gone above the second resonant capacitance voltage threshold. In an embodiment, the control stage is configured to, after delaying the switching, switch from third phase to the fourth phase in response to determining that the tank current signal goes below the tank current threshold.

In an embodiment, a method includes delaying switching from a first phase, in which a first switch of a converter is on and a second switch of the converter is off, to a second phase, in which the first and second switches are off, until determining that both: a tank current signal, representative of a tank current of the converter, goes below a tank current threshold and the switches have been in the first phase for more than a first minimum time period; determining if a resonant capacitor voltage of the converter has fallen below a first resonant capacitance voltage threshold; determining if the tank current signal, representative of a tank current of the converter, goes above the tank current threshold; switching from the first phase to the second phase in response to determining at least one of: the resonant capacitor voltage has fallen below the first resonant capacitance voltage threshold and the tank current signal goes above the tank current threshold; switching from the second phase to a third phase in which the second switch is on and the first switch is off; and switching from third phase to a fourth phase, in which the first and second switches are off.

In an embodiment, the method includes determining the first resonant capacitance voltage threshold based on an input voltage and a first output voltage of the converter; and determining a second resonant capacitance voltage threshold based on the input voltage and a second output voltage of the converter. In an embodiment, the method includes beginning to determine if the resonant capacitor voltage has fallen below the first resonant capacitance voltage threshold and beginning to determine if the tank current signal goes above the tank current threshold after determining that both: the switches have been in the first phase for the first minimum time period, and the tank current signal goes below the tank current threshold. In an embodiment, the method includes switching from the second phase to the third phase in response to determining that the switches have been in the second phase for a second minimum time period or longer.

In an embodiment, the method includes delaying switching from the third phase to the fourth phase until determining that the tank current signal is above the tank current threshold and the switches have been in the third phase for at least a first minimum time period. In an embodiment, the method includes after delaying the switching, switching from the third phase to the fourth phase in response to determining that the resonant capacitor voltage has gone above a second resonant capacitance voltage threshold. In an embodiment, the method includes after delaying the switching, switching from the third phase to the fourth phase in response to determining that the tank current signal goes below the tank current threshold. In an embodiment, the method includes delaying switching from the fourth phase to another phase in response to determining that the switches have been in the fourth phase for less than a second minimum time period.

DETAILED DESCRIPTION

Figure 1:
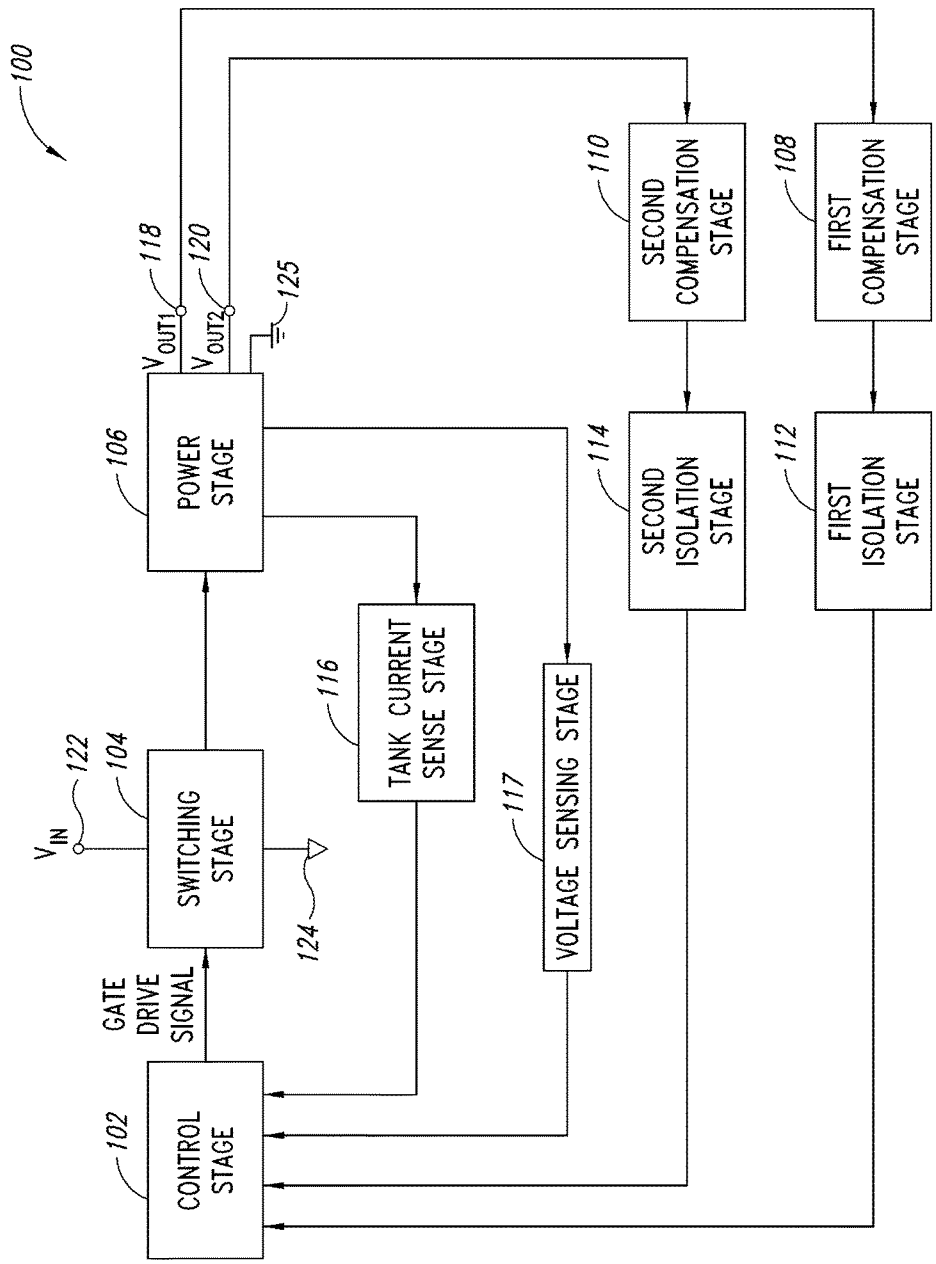
FIG. 1 shows a block diagram of a dual independent output LLC converter in accordance with an embodiment.

FIG. 1 shows a block diagram of a dual independent output LLC converter 100 in accordance with an embodiment. The converter 100 includes a control stage 102, a switching stage 104, a power stage 106, a first compensation stage 108, a second compensation stage 110, a first isolation stage 112, a second isolation stage 114, a tank current sensing stage 116 and a voltage sensing stage 117.

As a dual independent output converter, the converter 100 outputs two independent output voltages: a first output voltage ($V_{OUT1}$) and a second output voltage ($V_{OUT2}$). As shown in FIG. 1, the first output voltage ($V_{OUT1}$) is provided at a first output voltage node 118 and the second output voltage ($V_{OUT2}$) is provided at a second output voltage node 120.

The control stage 102 operates the converter 100 in one of a plurality of states. The control stage 102 determines first and second resonant voltage thresholds based on the input voltage and the first and second output voltages, respectively. The control stage 102 then determines the state in which to operate the converter 100 and whether to switch the converter between states based on comparing a resonant capacitance voltage of the converter with one of the resonant voltage thresholds. Further, the control stage 102 determines the state in which to operate the converter 100 and whether to switch states based on whether a tank current of the converter exceeds or is below a tank current threshold. Further, the control stage 102 may retain the converter 100 in one of the states for a minimum period of time before transitioning the converter 100 out of a state as described herein.

The power stage 106 of the converter 100 generates the output voltages based on a voltage received from the switching stage 104. The switching stage 104 is coupled, at an input, to an input voltage node 122 and a ground node 124. An input voltage ($V_{IN}$) is provided at the input voltage node 122 and a ground voltage is provided at the ground node 124. The input voltage ($V_{IN}$) is used to drive the power stage 106. The switching stage 104 also has an input for receiving one or more gate drive signals from the control stage 102. The one or more gate drive signals dictate operation of the switching stage 104. The switching stage 104 outputs the input voltage ($V_{IN}$) or the ground voltage to the power stage 106 depending on a state of the one or more gate drive signals. As described herein, at times, neither voltage may be provided and the switching stage 104 is not connected to a voltage supply node.

The power stage 106 uses the voltage received from the switching stage 104 to generate the two independent output voltages ($V_{OUT1}$ and $V_{OUT2}$). The power stage 106 may output the two independent output voltages to different loads or to the same load. The power stage 106 is coupled to a ground node 125, which may be a physical ground, whereas the ground node 124 may be a virtual ground. The ground nodes 124, 125 may provide ground for the primary and secondary sides of the converter 100, respectively, and may be decoupled from each other. The converter 100 has a feedback loop for controlling and regulating the output voltages ($V_{OUT1}$ and $V_{OUT2}$). The first compensation stage 108 has an input that is coupled to the first output voltage node 118. The first compensation stage 108 receives, at the input, the first output voltage ($V_{OUT1}$). The first compensation stage 108 compensates the first output voltage. The first compensation stage 108 has an output that provides a compensated first output voltage. The first compensation stage 108 may control its output using a filter implementing a control function, such as a Proportional Integral Derivative (PID).

The first isolation stage 112, which may include an optocoupler, among other couplers, may be configured to channel or tunnel signals between voltage or power domains without breaching a boundary (for example, a power domain isolation boundary). It is desirable for the isolation stage 112 to timely translate a signal of one power domain into another signal of another power domain. For example, it is desirable for a lag between the signals to be at a minimum.

The first isolation stage 112 has an input coupled to the output of the first compensation stage 108. The first isolation stage 112 receives, at the input, the compensated first output voltage. The first isolation stage 112 provides, at an output, an isolated first output voltage.

The second compensation stage 110 has an input coupled to the second output voltage node 120. The second compensation stage 110 receives, at the input, the second output voltage ($V_{OUT2}$). The second compensation stage 110 compensates the second output voltage. The second compensation stage 110 has an output that provides a compensated second output voltage. The second compensation stage 110 may control its output using a filter implementing a control function, such as a PID.

The second isolation stage 114, which may be similar to the first isolation stage 112 and may be an optocoupler, has an input coupled to the output of the second compensation stage 110. The second isolation stage 114 receives, at the input, the compensated second output voltage. The second isolation stage 114 provides, at an output, an isolated second output voltage.

The tank current sensing stage 116 of the converter 100 has an input coupled to the power stage 106. As described herein, the tank current sensing stage 116 detects a tank current of the power stage 106. The tank current sensing stage 116 has an output coupled to an input of the control stage 102. The tank current sensing stage 116 provides, at the output, a first sensing signal representative of the tank current of the power stage 106.

The voltage sensing stage 117 has an input coupled to the power stage 106. The voltage sensing stage 117 senses a voltage across a resonant capacitance of the power stage 106 of the converter 100 as described herein. The voltage sensing stage 117 has an output coupled to an input of the control stage 102. The voltage sensing stage 117 provides, at the output, a second sensing signal representative of the voltage across the resonant capacitance of the power stage 106. In an embodiment, the voltage sensing stage 117 may be a resistance or a capacitance, among others.

The control stage 102 may be any type of controller, such as a microcontroller, a processor or a microprocessor, among others. The control stage 102 may include control logic (not shown), which may be analog or digital circuitry. The control stage 102 (or control logic thereof) is configured to operate and control the converter 100 (or its switching stage 104 or power stage 106) in accordance with the embodiments described herein. Although not shown, the control stage 102 may include a non-transitory computer-readable storage medium or memory configured to store executable instructions that, when executed by the control stage 102 (or control logic thereof), cause the control stage 102 to operate and/or control the converter 100 (or its switching stage 104 or power stage 106) as described herein.

The control stage 102 has a plurality of inputs. The control stage 102 has a first input coupled to the output of the first isolation stage 112, a second input coupled to the output of the second isolation stage 114, a third input coupled to the output of the tank current sensing stage 116 and a fourth input coupled to the output of the voltage sensing stage 117. The control stage 102 receives the compensated first and second output voltages and the first and second sensing signals. The control stage 102 determines the timing of operating the switching stage 104 based on the compensated first and second output voltages and the sensing signals. The control stage 102 outputs the one or more gate drive signals for controlling the switching stage 104.

Figure 2:
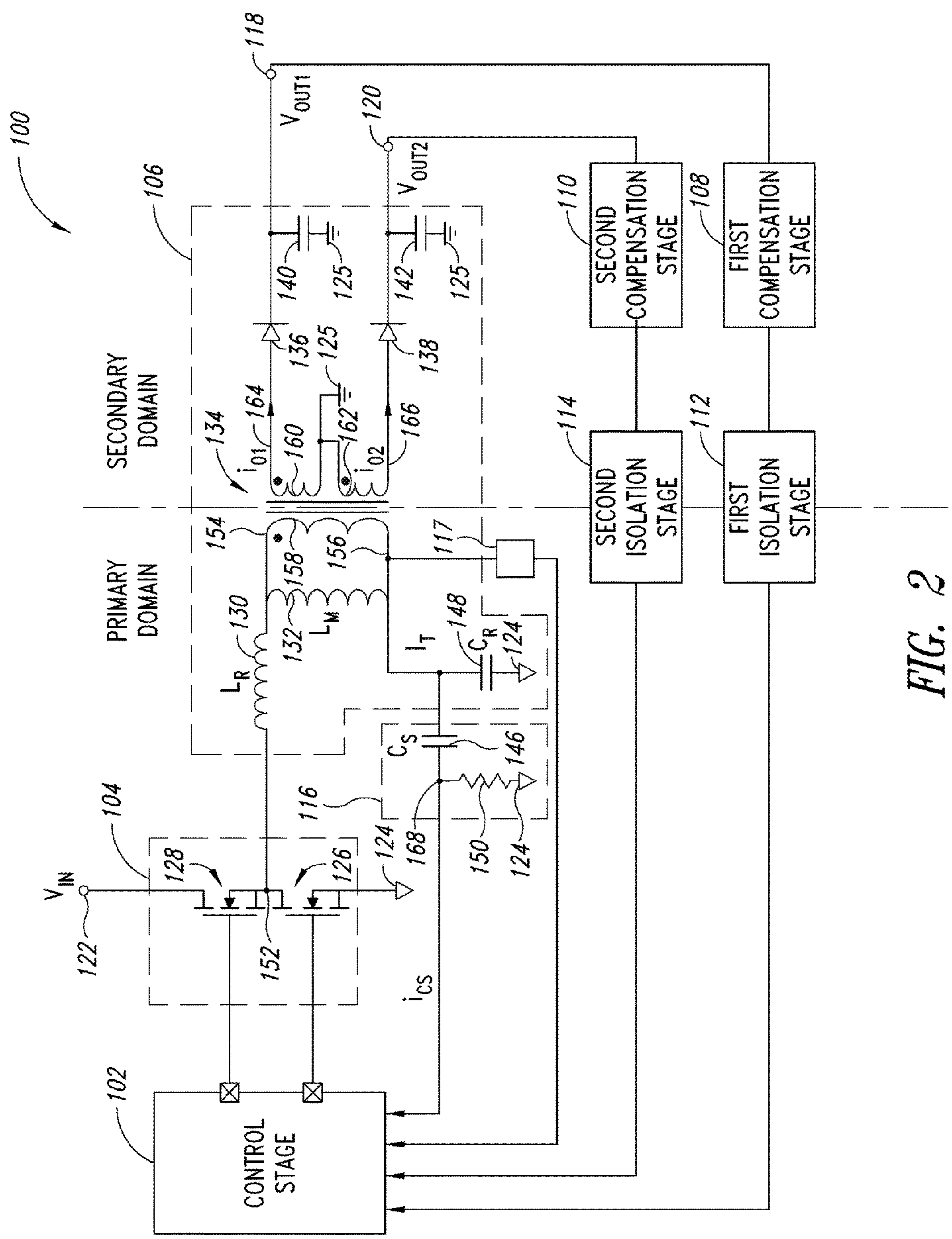
FIG. 2 shows a circuit diagram of the dual independent output LLC converter in accordance with an embodiment.

FIG. 2 shows a circuit block diagram of the dual independent output LLC converter 100 in accordance with an embodiment. Similar elements of the converter 100 to those described with reference to FIG. 1 have the same reference numerals.

The switching stage 104 includes a first transistor 126 and a second transistor 128. The power stage 106 includes a resonant inductance 130, a shunt inductance 132, a transformer 134, a resonant capacitance 148, a first diode 136, a second diode 138, a first output capacitance 140 and a second output capacitance 142. The tank current sensing stage 116 includes a sense capacitance 146 and a sense resistance 150.

In the switching stage 104, the first and second transistors 126, 128 are shown as n-channel metal-oxide-semiconductor field-effect transistors (MOSFETs), however, any other type of transistor or switch may alternatively be used. The first transistor 126 has a drain coupled to an intermediary node 152, a source coupled to the ground node 124 and a gate for receiving a first gate drive signal. The second transistor 128 has a drain coupled to the input voltage node 122, a source coupled to the intermediary node 152 and a gate for receiving a second gate drive signal.

The resonant inductance 130 is coupled between the intermediary node 152 and a first primary side node 154. The shunt inductance 132 is coupled between the first primary side node 154 and a second primary side node 156. The transformer 134 has a primary winding 158 coupled between the first and second primary side nodes 154, 156. The primary winding 158, which is in the primary domain, is galvanically isolated from a first secondary winding 160 and a second secondary winding 162, that is in the secondary domain. The transformer's secondary side is center-tapped, whereby the first secondary winding 160 is coupled between a first secondary side node 164 and a ground node 125 and the second secondary winding 162 is coupled between the ground node 125 and a second secondary side node 166. The resonant capacitance 148 is coupled between the second secondary side node 166 and the ground node 125.

The first diode 136 has an anode coupled to the first secondary side node 164 and a cathode coupled with the first output voltage node 118. The first output capacitance 140 is coupled between the first output voltage node 118 and the ground node 125. The second diode 138 has an anode coupled to the second secondary side node 166 and a cathode coupled to second output voltage node 120. The second output capacitance 142 is coupled between the second output voltage node 120 and the ground node 125.

In the tank current sensing stage 116, the sense capacitance 146 is coupled between the second primary side node 156 and an output node 168. The sense resistance 150 is coupled between the output node 168 and the ground node 124. The tank current sensing stage 116 senses the tank current ($i_T$) flowing into the resonant capacitance 148 ($C_r$) of the power stage 106. The tank current sensing stage 116 outputs a first sensing signal ($i_{cs}$) representative of the tank current ($i_T$) of the power stage 106.

The control stage 102 outputs first and second gate drive signals to the switching stage 104. The first and second gate drive signals may have opposite states when either is asserted. For example, when the first gate drive signal is asserted (activated, active or has a logical state of one), the second gate drive signal will be deasserted (deactivated, inactive or has a logical state of zero). The first gate drive signal, when asserted, causes the first transistor 126 to transition to the electrically conductive state (closed state). In the meantime, the second gate drive signal is deasserted, and the second transistor 128 is in the electrically non-conductive state (open state). When the first transistor 126 is in the electrically conductive state, the ground voltage is supplied to the power stage 106.

The control stage 102 deasserts the first gate drive signal and asserts the second gate drive signal to supply the input voltage ($V_{IN}$) to the power stage 106. When the first gate drive signal is deasserted and the second gate drive signal is asserted, the first transistor 126 is open and the second transistor 128 is closed. Thus, the input voltage ($V_{IN}$) is applied to the power stage 106. The first and second gate drive signals may both be deasserted, in which case neither the input voltage nor the ground voltage is provided to the power stage 106.

The duration of time that the first gate to drive signal is asserted and the duration of time that the second a gate drive signal is asserted control the first and second output voltages ($V_{OUT1}$ and $V_{OUT2}$) of the converter 100. It is noted that the loads (not shown) that are connected to the first and second output voltage nodes 118, 120 and that draw the first and second output voltages ($V_{OUT1}$ and $V_{OUT2}$) also affects the voltages.

The control stage 102 controls the output voltages ($V_{OUT1}$ and $V_{OUT2}$) of the converter 100 based on feedback voltages (the isolated first and second output voltages) received from the first and second isolation stages 112, 114. In addition to the feedback voltages, the control stage 102 uses the sensing signals to drive the power stage 106 and control the output voltages. As described herein, the sensing signals are indicative of the voltage across the resonant capacitance 148 of the power stage 106 and the tank current passing through the second primary side node 156.

Figure 3:
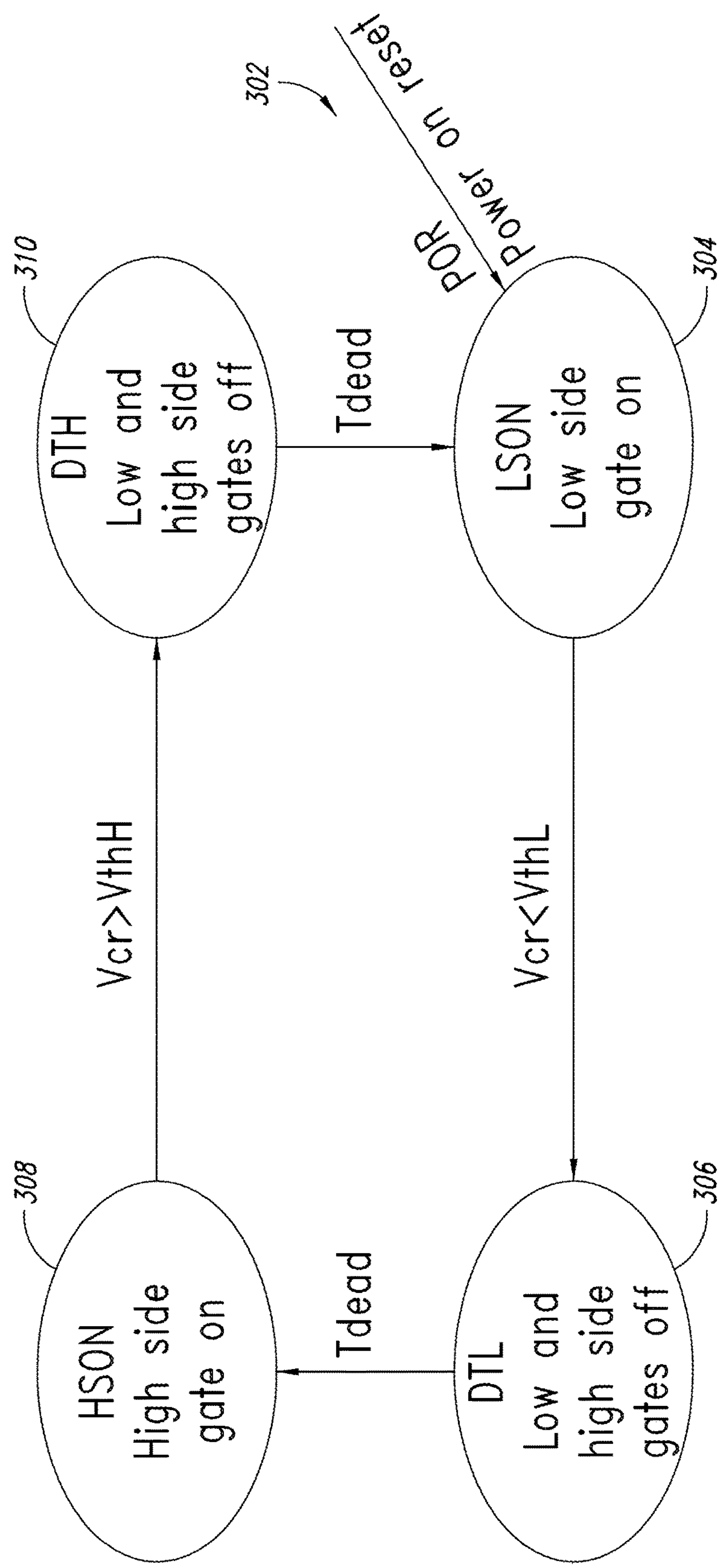
FIG. 3 shows a state diagram for controlling a converter in accordance with an embodiment.

FIG. 3 shows a state diagram for controlling the converter 100 in accordance with an embodiment. The converter 100 is initially powered 302 or turned on. When the converter 100 is powered, the control stage 102 puts the converter 100 in a first state 304, denoted as 'LSON' or low side on, in reference to turning on or switching to the electrically-conductive state the first transistor 126 of the switching stage 104, or the low transistor in a stack in relation to the high second transistor 128. In the first state 304, the first gate drive signal is activated and the second gate drive signal is deactivated resulting in turning on the first transistor 126 and turning off the second transistor 128 and supplying a ground voltage to the power stage 106.

While the converter 100 is in the first state 304, the control stage 102 determines whether the voltage of the resonant capacitance 148 ($V_{Cr}$) represented by the second sending signal is below a first threshold for the resonant capacitance voltage. If the control stage 102 determines that the resonant capacitance voltage ($V_{Cr}$) is higher than the first threshold, the control stage 102 retains the converter 100 and the first state 304. Conversely, if the control stage 102 determines that the resonant capacitance voltage ($V_{Cr}$) is lower than the first threshold, the control stage 102 transitions the converter 100 to a second state 306. The control stage 102 evaluates whether the resonant capacitance voltage is lower than the first threshold periodically or according to a time schedule.

The second state 306 is denoted as dead time low or 'DTL' herein. In the second state 306, the first and second gate drive signals are deactivated and both transistors 126, 128 are in the electrically non-conductive state. The control stage 102 keeps the converter 100 in the second state 306 for a duration of time (denoted herein as '$T_{dead}$'). The duration of time may be predetermined. The control stage 102 may be configured with the duration of time ($T_{dead}$), whereby the duration of time may be stored in a memory of the control stage 102.

After the duration of time expires, the control stage 102 transitions the converter 100 to a third state 308, denoted herein as 'HSON' or high side on, in reference to turning on or switching to the electrically-conductive state the second transistor 128 that is the higher transistor in a stack of the switching stage 104. In the third state 308, the first gate drive signal is deactivated and the second gate drive signal is activated resulting in turning off the first transistor 126 and turning on the second transistor 128. Consequently, the input voltage ($V_{IN}$) is supplied to the power stage 106.

While the converter is in the third state 308, the control stage 102 determines whether the resonant capacitance voltage ($V_{Cr}$) is greater than a second threshold. As described herein, the second threshold for the voltage of the resonant capacitance is greater than the first threshold. If the control stage 102 determines that the resonant capacitance voltage is not greater than the second threshold, the control stage 102 retains the converter 100 in the third state 308. Conversely, if the control stage 102 determines that the resonant capacitance voltage is greater than the second threshold, the control stage 102 transitions the converter 100 to a fourth state 310.

The fourth state 310 is denoted herein as 'DTH' or dead time high, because it follows the state in which the high side of the switching stage 104 was in the on-state. Similar to the second state 306, in the fourth state 310, both the first and second gate drive signals are deactivated and both the first and second transistors 126, 128 are non-conductive. The control stage 102 retains the converter 100 in the fourth state 310 for the duration of time ($T_{dead}$). After that the duration of time elapses the control stage 102 transitions the converter 100 back to the first state 304. It is noted that the duration of time ($T_{dead}$) for the second and fourth states 306, 310 may be the same or different.

Accordingly, per the method of FIG. 3, when the resonant capacitance voltage exceeds the second threshold, the input voltage ($V_{IN}$) is no longer provided to the power stage 106. After the expiration of a minimum of time, the ground voltage is provided to the power stage 106. The ground voltage continues to be provided until the resonant capacitance voltage drops below the first threshold. Then, the ground voltage is ceased to be provided to the power stage 106. After the minimum period of time expires again, the input voltage is provided to the power stage 106.

The first and second thresholds may be determined as a function of the first and second output voltages (or feedback voltages representative of the first and second output voltages). The first threshold may be represented as:

$$Vth_L = \frac{V_{IN}}{2} - (I_2 + (\pi - 1)I_1)\sqrt{\frac{L_r}{C_r}}, \qquad \text{Equation (1)}$$

where $I_1$ is the current flowing in the first primary side node 154 during conduction of diode 136, $I_2$ is the current flowing in the first primary side node 154 during conduction of diode 138, $L_r$ is the resonant inductance and $C_r$ is the resonant capacitance.

The second threshold may be represented as:

$$Vth_H = \frac{V_{in}}{2} + (I_1 + (\pi - 1)I_2)\sqrt{\frac{L_r}{C_r}}. \qquad \text{Equation (2)}$$

The terms for the first and second output currents and the resonant inductance and capacitance may be replaced with the terms for the first and second feedback voltages ($V_{fb1}$ and $V_{fb2}$). The first and second thresholds may be represented as:

$$Vth_L = \frac{V_{in}}{2} - g_1\left(\frac{1}{\pi}V_{fb2} + \frac{(\pi - 1)}{\pi}V_{fb1}\right), \qquad \text{Equation (3)}$$

and $$Vth_H = \frac{V_{in}}{2} + g_2\left(\frac{1}{\pi}V_{fb1} + \frac{(\pi - 1)}{\pi}V_{fb2}\right). \qquad \text{Equation (4)}$$

where $g_1$ and $g_2$ are first and second gain terms, respectively.

Equations (3) and (4) may be simplified as:

$$Vth_L \approx \frac{V_{in}}{2} - g_1 V_{fb1}, \qquad \text{Equation (5)}$$

and $$Vth_H \approx \frac{V_{in}}{2} + g_2 V_{fb2}. \qquad \text{Equation (6)}$$

Thus, the first threshold may be estimated to be solely dependent on the input voltage, the first feedback voltage and the first gain term. Similarly, the second threshold may be estimated to be solely dependent on the input voltage, the second feedback voltage and the second gain term.

The control stage 102 receives the first and second feedback voltages from the first and second isolation stages 112, 114, respectively. The control stage 102 determines the first threshold based on the input voltage, the first feedback voltage and the first gain term. The control stage 102 also determines the second threshold voltage based on the input voltage, the second feedback voltage and the second gain term. The control stage 102 may be configured with the first and second gain terms, which may be stored by the control stage 102.

Figure 4:
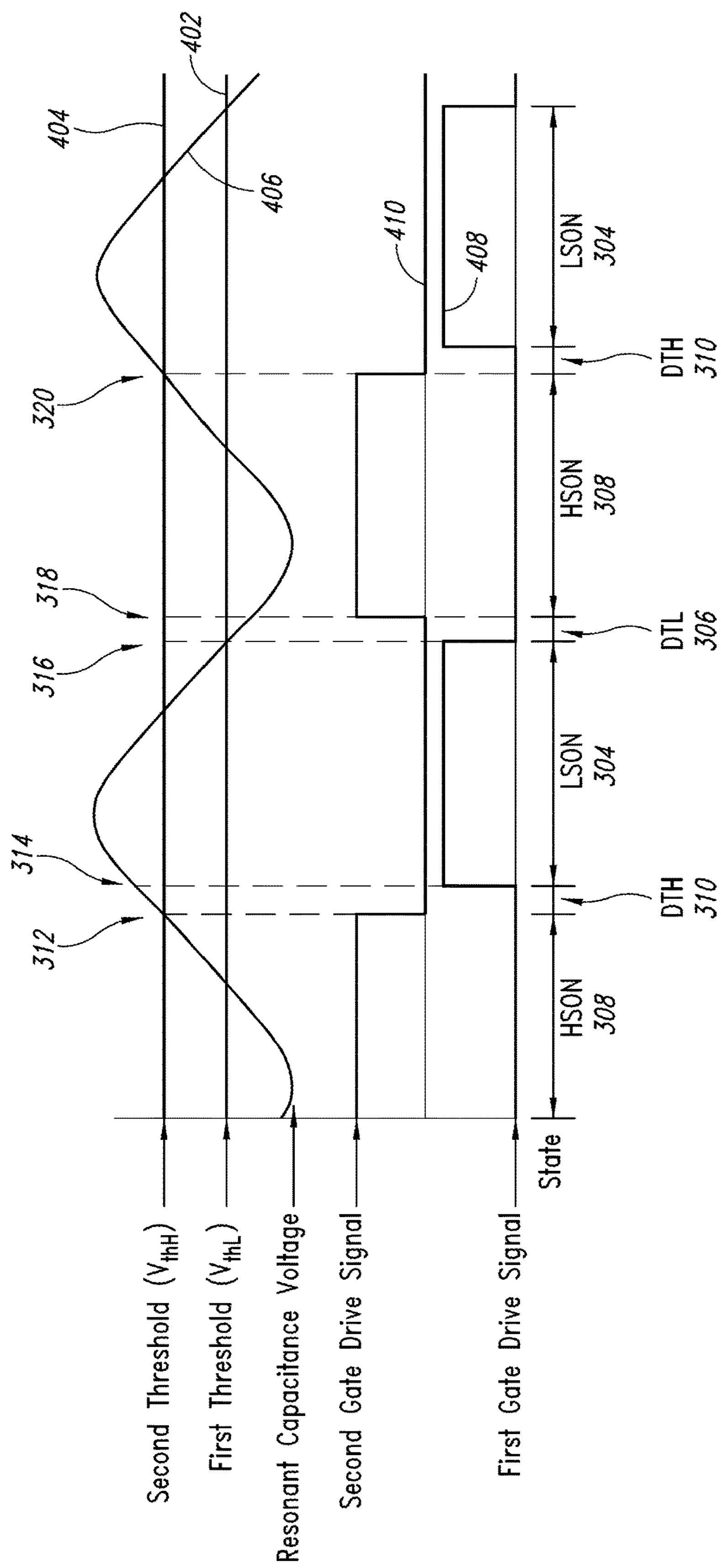
FIG. 4 shows a signal diagram for operating a converter in accordance with an embodiment.

FIG. 4 shows a signal diagram for operating the converter 100 in accordance with an embodiment. In FIG. 4, the first threshold 402, the second threshold 404, the resonant capacitance voltage 406, the first gate drive signal 408 and the second gate drive signal 410 are shown.

Initially, the converter 100 is in the third state 308, whereby the second gate drive signal is asserted and the second transistor 128 of the switching stage 104 is closed. At a first time instance 312, the control stage 102 determines that the resonant capacitance voltage exceeds the second threshold. In response to the determination, the control stage 102 transitions the converter 100 to the fourth state 310. The converter 100 remains in the fourth state 310 for the duration of time ($T_{dead}$). At a second time instance 314, the duration of time expires. In response, the control stage 102 transitions the converter 100 to the first state 304. The converter 100 remains in the first state 304 until the resonant capacitance voltage drops below the first threshold at a third time instance 316. The control stage 102 identifies that the resonant capacitance voltage has dropped below the first threshold. In response, the control stage 102 transitions the converter 100 to the second state 306.

The control stage 102 retains the converter 100 in the second state 306 for the duration of time. It is noted that the durations of time that the converter 100 remains in the second and fourth states 306, 310 may be the same or different. At a fourth time instance 318, the duration of time expires. The control stage 102 detects that the duration of time expired. The control stage 102 transitions the converter to the third state 308. The converter 100 remains in the third state 308 until the resonant capacitance voltage becomes greater than the second threshold at a fifth time instance 320. In response to which, the control stage 102 transitions the converter 100 to the fourth state 310.

It is noted that controlling the converter in accordance with the state diagram of FIG. 3 may result in critical operating conditions. If the resonant capacitance voltage does not drop below the first threshold, the converter 100 may not exit the first state 304 and transition to the second state 306. Similarly, if the resonant capacitance voltage does not exceed the second threshold, the converter 100 may not exit the third state 308 and transition to the fourth state 310.

Another critical condition may occur when the first and second thresholds are inverted. For example, under normal operating conditions the second threshold is greater than the first threshold. However, if the thresholds (determined based on Equations (5) and (6) above) are inverted such that the first threshold is greater than the second threshold, the converter 100 switching frequency may become infinite in a theoretical sense.

To mitigate threshold inversion and the scenario where the resonant capacitance voltage does not cross over one of the thresholds, alternative state switching for operating the converter 100 may be used.

Figure 5:
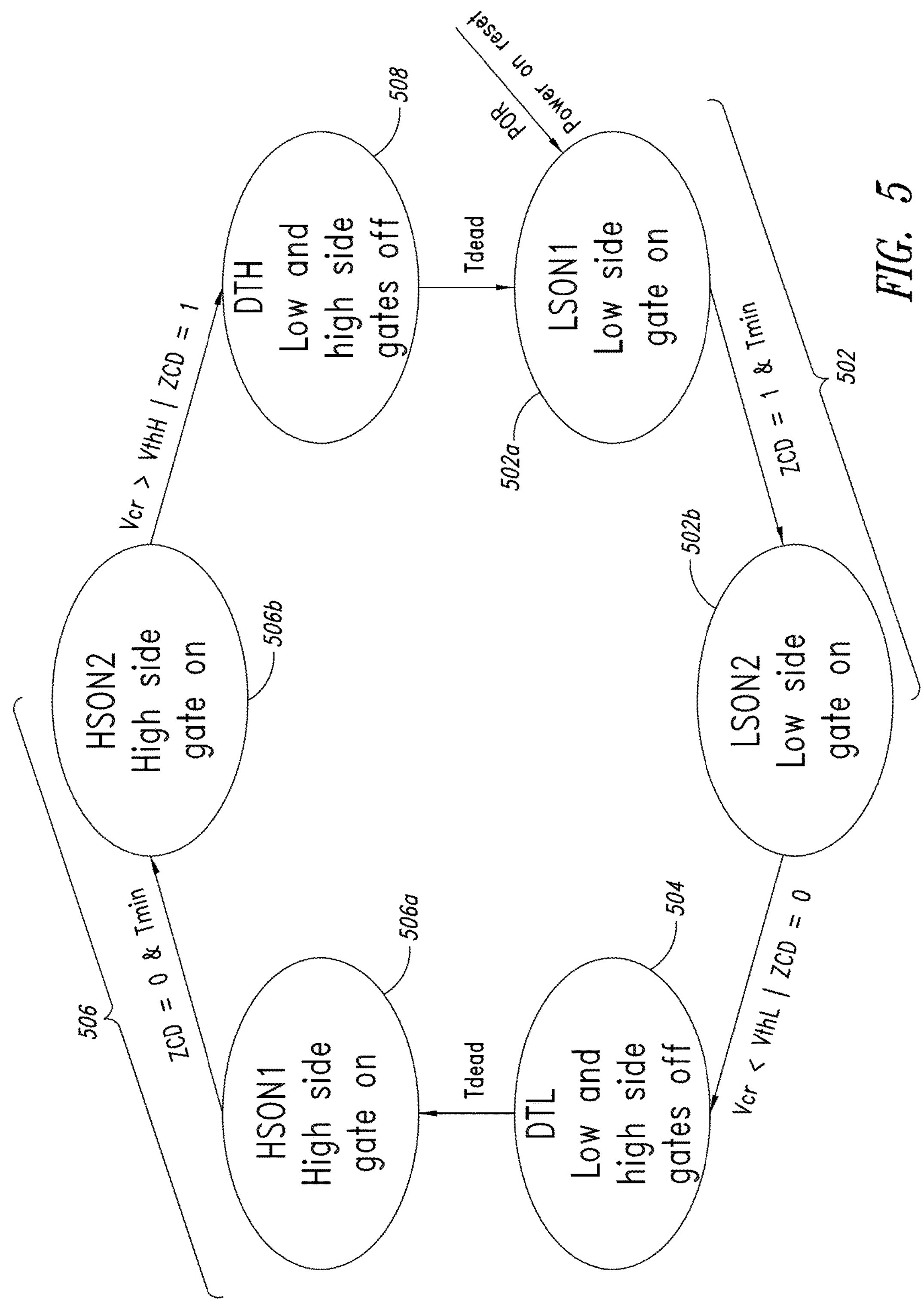
FIG. 5 shows a state diagram for controlling a converter in accordance with an embodiment.

FIG. 5 shows a state diagram for controlling the converter 100 in accordance with an embodiment. The state diagram includes a first state 502, a second state 504, a third state 506 and a fourth state 508. The first state 502 includes a first substate 502*a* and the second substate 502*b*, and the third state includes a first substate 506*a* and a second substate 506*b*. In the first state 502, the first transistor 126 is closed and the second transistor 128 is open. In the second state 504, both transistors 126, 128 are open. In the third state 506, the first transistor 126 is open and the second transistor 128 is closed. In the fourth state 508, both transistors 126, 128 are open.

When the converter 100 is powered, the control stage 102 puts the converter 100 in the first substate 502*a* of the first state 502 (denoted herein as 'LSON1'). Alternatively, the control stage 102 may put the converter 100 in another state upon starting or powering the converter 100.

In the first state 502 (and its substates 502*a*, 502*b*), the first gate drive signal is asserted and the first transistor 126 is closed so that a ground voltage is supplied to the power stage 106. The control stage 102 retains the converter 100 in the first substate 502*a* of the first state 502 at least until two conditions are satisfied. The first condition is satisfied when a first period of time (denoted herein as 'Tmin') has elapsed. The second condition is satisfied when the tank current ($i_T$) is lower than a tank current threshold, which may be 0 A. For example, the second condition may be satisfied when the tank current is negative or inverted. When the tank current is negative, zero current detection (ZCD) is set to have been made.

Accordingly, the control stage 102 retains the converter 100 in the first substate 502*a* of the first state 502 for at least the duration of the first period of time. The first period of time may commence when the converter 100 is placed in the first substate 502*a*. The control stage 102 may retain the converter 100 in the first substate 502*a* for longer than the duration of the first period of time (Tmin) and until the tank current becomes lower than the threshold. The control stage 102 may retain the converter 100 in the first substate 502*a* for a duration that is the greater of: the first period of time (Tmin) and a period of time required for the tank current to become lower than the tank current threshold, which may be 0 A.

While in the first substate 502*a*, the control stage 102 monitors the tank current. When both the duration of the first period of time elapses and the tank current becomes negative or is inverted, the control stage 102 transitions the converter 100 to the second substate 502*b* of the first state 502.

At any point in the second substate 502*b*, the control stage 102 may transition the converter 100 to the second state 504 provided that one or more of two conditions is met. In the second substate 502*b* of the first state 502, the control stage 102 monitors the resonant capacitance voltage and the tank current. Further, the control stage 102 identifies whether either one of two conditions are met based at least in part on monitoring the resonant capacitance voltage and the tank current. The first condition is met when the resonant capacitance voltage is below the first threshold. The second condition is met when the tank current is at or above 0 A.

The control stage 102 transitions the converter 100 to the second state 504 on a condition that at least one of the two conditions is met (i.e., the resonant capacitance voltage is below the first threshold and/or the tank current is at or above 0 A). The control stage 102 may retain the converter 100 in the first state 502 for any duration of time before transitioning the converter 100 out of the first state 502 and to the second state 504 when at least one of the two conditions is met. As described herein, in the second state 504, both gate drive signals are deasserted and the transistors 126, 128 are in the electrically non-conductive state.

The control stage 102 retains the converter 100 in the second state 504 for a second period of time ($T_{dead}$). The control stage 102 may include a timer and may initialize the timer upon transitioning the converter 100 to the second state 504. The control stage 102 may measure, using the timer, the duration of time elapsing from initialization of the timer. When the duration of time reaches the second period of time, the control stage 102 transitions the converter 100 to the first substate 506*a* of the third state 506.

While the converter 100 is in the first substate 506*a* of the first state 502, the second gate drive signal is asserted and the second transistor 128 is closed. Further, the control stage 102 monitors the tank current. The control stage 102 determines whether two conditions are met. For a first condition, the control stage 102 monitors the tank current and determines whether the tank current is equal to or is greater than the tank current threshold. For example, the first condition is met if the tank current is equal to or is greater than 0 A. The second condition is a temporal condition. The control stage 102 monitors a time period elapsing from entry into the first substate 506*a* of the third state 506. The second condition is satisfied when the elapsed time is equal to or greater than the first period of time (Tmin).

When both conditions are met, the control stage 102 transitions the converter 100 to the second substate 506*b* of the third state 506. The controller converter 100 remains in the first substate 506*a* for at least the first period of time. Use of the first substate 506*a* ensures that the converter 100 is in the third state 506 for at least the first period of time (Tmin) and that the converter 100 stays in, and does not transition out, of the third state 506, until at least the first period of time (Tmin) has elapsed.

When the converter 100 is in the second substate 506*b* of the third state 506, the converter 100 may transition out of the third state 506 without a requirement that a minimum period of time has elapsed. In the second substate 506*b* of the third state 506, the control stage 102 monitors (or determines) the resonant capacitance voltage and the tank current. The control stage 102 causes the converter 100 to transition to the fourth state 508 on a condition that at least one of two conditions is met. The first condition is met when the resonant capacitance voltage exceeds the second threshold, and the second condition is met when the tank current is lower than the tank current threshold.

When the control stage 102 determines that at least one of the two conditions is met, the control stage 102 causes the converter 100 to transition to the fourth state 508. In the fourth state both gate drive signals are deasserted and both transistors are in the open state. The control stage 102 retains the converter 100 in the fourth state for the second period of time ($T_{dead}$). The control stage 102 determines whether the second period of time ($T_{dead}$) has elapsed since the converter 100 transitioned to the fourth state. Once the control stage 102 determines that the second period of time has elapsed, the control stage 102 causes the converter 100 to transition to the first substate 502*a* of the first state 502.

Operating the converter 100 in accordance with the state diagram of FIG. 5 ensures that the converter 100 is retained in the first state 502 for at least the first period of time (Tmin). Further, the converter 100 transitions to the second state if a current condition of the converter 100 is met, even though the resonant capacitance voltage is not below the first threshold. In addition, the converter 100 is retained in the third state 506 for at least the first period of time (Tmin), and the converter 100 exits the third state 506 and transitions to the fourth state 508 if a current condition of the converter 100 is met, even though the resonant capacitance voltage has is not exceeded the second threshold. Accordingly, the two critical operating conditions for controlling the converter 100 are compensated for.

Figure 6:
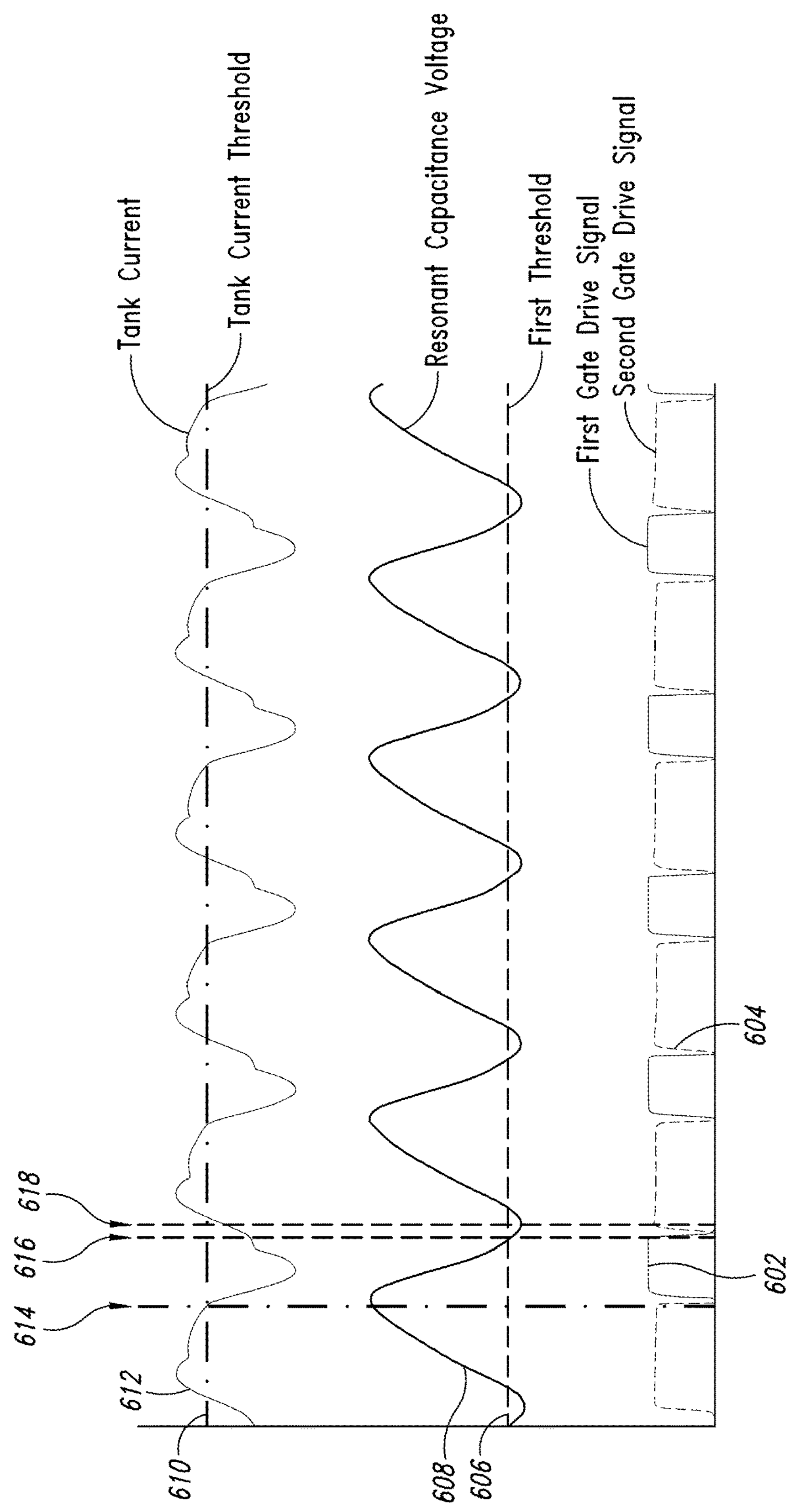
FIG. 6 shows a signal diagram for operating a converter in accordance with the state diagram of FIG. 5.

FIG. 6 shows a signal diagram for operating the converter 100 in accordance with the state diagram of FIG. 5. The first gate drive signal 602, the second gate drive signal 604, the first threshold 606, the resonant capacitance voltage 608, the tank current threshold 610 and the tank current 612 are shown in FIG. 5.

Initially, converter 100 is in the third state 506, whereby the second gate drive signal 604 is asserted. At a first time instance 614, the tank current 612 drops below the zero tank current threshold 610. In response, the control stage 102 transitions the converter 100 to the fourth state 508, where both the first and second gate drive signals 602, 604 are deasserted. The converter 100 operates in the fourth state 508 for the second period of time. After the expiration of the second period of time, the control stage 102 transitions the converter to the first state 502, where the first gate drive signal 602 is asserted.

The converter 100 remains in the first state 502 for at least the first period of time. After the first period of time expires and at a second time instance 616, the resonant capacitance voltage 608 drops below the first threshold 606. In response, the control stage 102 transitions the converter 100 to the second state 504. The converter 100 remains in the second state 504 for the second period of time ($T_{dead}$). At a third time instance 618, when the second period of time expires, the control stage 102 transitions the converter 100 to the third state 506.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A controller for controlling a power converter having a power stage with first and second output terminals, the controller comprising: first and second switches configured to control the power stage; and a control stage configured to control the first and second switches using a method that includes: determining a first resonant capacitance voltage threshold based on at least a first output voltage at the first output terminal; determining a second resonant capacitance voltage threshold based on at least a second output voltage at the second output terminal; switching from a first phase, in which the first switch is on and the second switch is off, to a second phase, in which the first and second switches are off, in response to determining that a resonant capacitor voltage of the power stage has fallen below the first resonant capacitance voltage threshold; switching from the second phase to a third phase in which the second switch is on and the first switch is off, and switching from third phase to a fourth phase, in which the first and second switches are off, in response to determining that the resonant capacitor voltage of the power stage has gone above the second resonant capacitance voltage threshold.

2. The controller of claim 1, wherein the control stage is configured to switch from the first phase to the second phase in response to determining that a tank current signal, representative of a tank current of the power stage, goes below a tank current threshold and then goes above the tank current threshold.

3. The controller of claim 1, wherein the control stage is configured to delay switching from the first phase to the second phase in response to determining that the switches have been in the first phase for less than a first minimum time period.

4. The controller of claim 1, wherein the control stage is configured to switch from the first phase to the second phase in response to determining that the resonant capacitor voltage of the power stage has fallen below the first resonant capacitance voltage threshold after determining that a tank current signal, representative of a tank current of the power stage, goes below a tank current threshold.

5. The controller of claim 1, wherein the control stage is configured to delay switching from the second phase to the third phase in response to determining that the switches have been in the second phase for less than a second minimum time period.

6. The controller of claim 1, wherein the control stage is configured to switch from the third phase to the fourth phase in response to determining that a tank current signal, representative of a tank current of the power stage, goes above a tank current threshold and then goes below the tank current threshold.

7. The controller of claim 1, wherein the control stage is configured to delay switching from the third phase to the fourth phase in response to determining that the switches have been in the third phase for less than a first minimum time period.

8. The controller of claim 1, wherein the control stage is configured to switch from the third phase to the fourth phase in response to determining that the resonant capacitor voltage of the power stage has risen above the second resonant capacitance voltage threshold after determining that a tank current signal, representative of a tank current of the power stage, goes above a tank current threshold.

9. The controller of claim 1, wherein the control stage is configured to delay switching from the fourth phase to another phase in response to determining that the switches have been in the fourth phase for less than a second minimum time period.

10. A power converter, comprising:

a power stage with first and second output terminals;

a switching stage with first and second switches configured to control the power stage; and a control stage configured to control the first and second switches using a method that includes:

delaying switching from a first phase, in which the first switch is on and the second switch is off, to a second phase, in which the first and second switches are off, until determining that both: a tank current signal, representative of a tank current of the power stage, goes below a tank current threshold and the switches have been in the first phase for more than a first minimum time period;

determining a first resonant capacitance voltage threshold based on at least a first output voltage at the first output terminal;

determining a second resonant capacitance voltage threshold based on at least a second output voltage at the second output terminal;

determining if a resonant capacitor voltage of the power stage has fallen below the first resonant capacitance voltage threshold;

determining if the tank current signal goes above the tank current threshold;

switching from the first phase to the second phase in response to determining at least one of: the resonant capacitor voltage of the power stage has fallen below the first resonant capacitance voltage threshold and the tank current signal goes above the tank current threshold;

switching from the second phase to a third phase in which the second switch is on and the first switch is off; and switching from the third phase to a fourth phase, in which the first and second switches are off.

11. The power converter of claim 10, wherein the control stage is configured to:

begin determining if the resonant capacitor voltage of the power stage has fallen below the first resonant capacitance voltage threshold and begin determining if the tank current signal goes above the tank current threshold after determining that both: the switches have been in the first phase for the first minimum time period, and the tank current signal goes below the tank current threshold.

12. The power converter of claim 10, wherein the control stage is configured switch from the second phase to the third phase in response to determining that the switches have been in the second phase for a second minimum time period or longer.

13. The controller of claim 10, wherein the control stage is configured to delay switching from the third phase to the fourth phase until the control stage determines that the tank current signal is above the tank current threshold and the switches have been in the third phase for at least the first minimum time period.

14. The controller of claim 10, wherein the control stage is configured to, after delaying the switching, switch from third phase to the fourth phase in response to determining that the resonant capacitor voltage has gone above the second resonant capacitance voltage threshold.

15. The controller of claim 10, wherein the control stage is configured to, after delaying the switching, switch from third phase to the fourth phase in response to determining that the tank current signal goes below the tank current threshold.

16. A method, comprising:

delaying switching from a first phase, in which a first switch of a converter is on and a second switch of the converter is off, to a second phase, in which the first and second switches are off, until determining that both: a tank current signal, representative of a tank current of the converter, goes below a tank current threshold and the switches have been in the first phase for more than a first minimum time period;

determining a first resonant capacitance voltage threshold based on at least a first output voltage of the converter:

determining, a second resonant capacitance voltage threshold based on at least a second output voltage of the converter, determining if a resonant capacitor voltage of the converter has fallen below the first resonant capacitance voltage threshold;

determining if the tank current signal, representative of the tank current of the converter, goes above the tank current threshold;

switching from the first phase to the second phase in response to determining at least one of: the resonant capacitor voltage has fallen below the first resonant capacitance voltage threshold and the tank current signal goes above the tank current threshold;

switching from the second phase to a third phase in which the second switch is on and the first switch is off; and switching from third phase to a fourth phase, in which the first and second switches are off.

17. The method of claim 16, further comprising:

beginning to determine if the resonant capacitor voltage has fallen below the first resonant capacitance voltage threshold and beginning to determine if the tank current signal goes above the tank current threshold after determining that both: the switches have been in the first phase for the first minimum time period, and the tank current signal goes below the tank current threshold.

18. The method of claim 16, further comprising:

switching from the second phase to the third phase in response to determining that the switches have been in the second phase for a second minimum time period or longer.

19. The method of claim 16, further comprising:

delaying switching from the third phase to the fourth phase until determining that the tank current signal is above the tank current threshold and the switches have been in the third phase for at least the first minimum time period.

20. The method of claim 19, further comprising:

after delaying the switching, switching from the third phase to the fourth phase in response to determining that the resonant capacitor voltage has gone above the second resonant capacitance voltage threshold.

21. The method of claim 19, further comprising:

after delaying the switching, switching from the third phase to the fourth phase in response to determining that the tank current signal goes below the tank current threshold.

22. The method of claim 16, further comprising:

delaying switching from the fourth phase to another phase in response to determining that the switches have been in the fourth phase for less than a second minimum time period.

* * * * *